April 3, 1945.    G. R. COSS ET AL    2,372,660
ELECTRIC MOTOR CONSTRUCTION
Filed Oct. 8, 1943
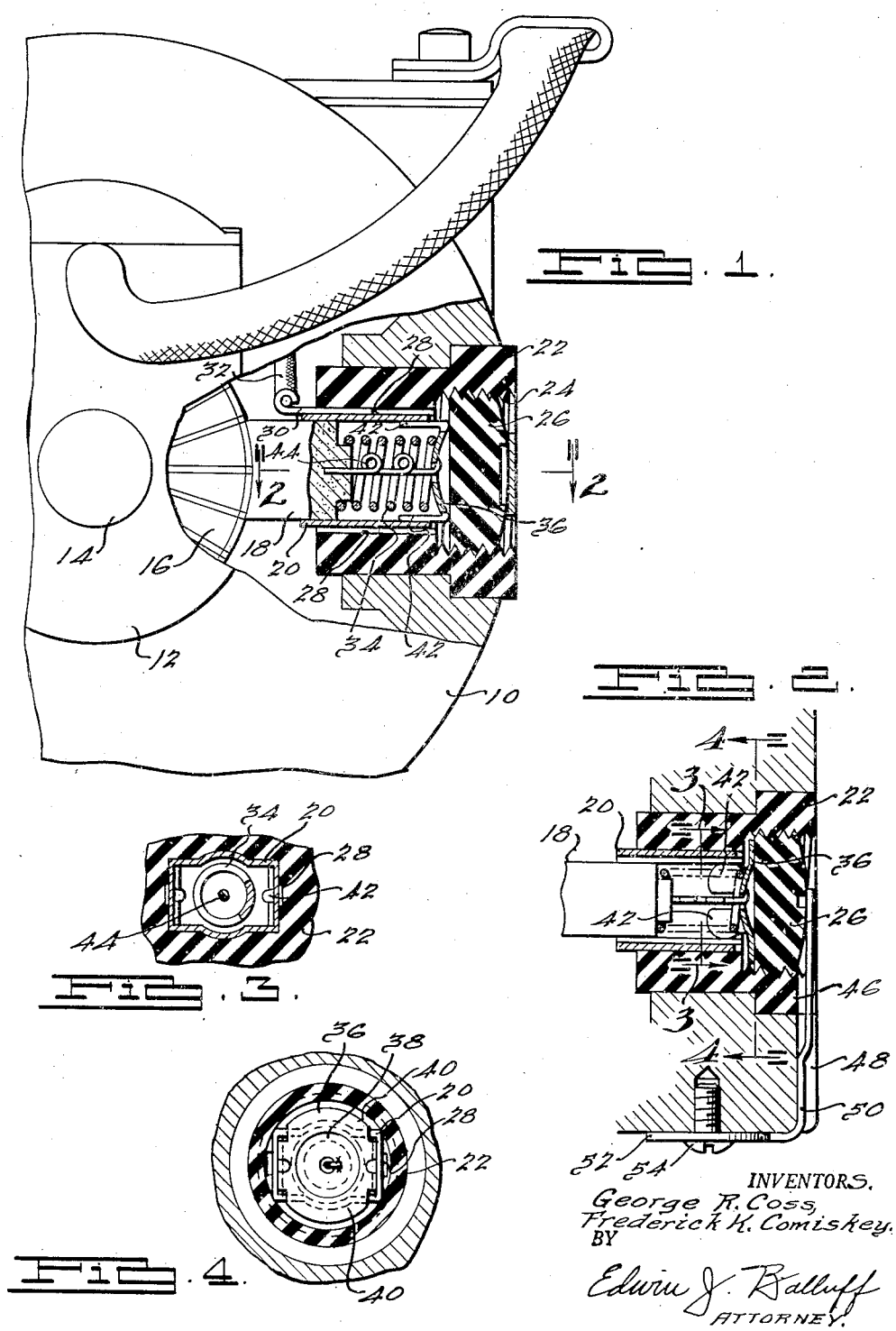
INVENTORS.
George R. Coss,
Frederick K. Comiskey.
BY
Edwin J. Balluff
ATTORNEY.

Patented Apr. 3, 1945

2,372,660

UNITED STATES PATENT OFFICE 2,372,660

ELECTRIC MOTOR CONSTRUCTION

George R. Coss and Frederick K. Comiskey, Detroit, Mich., assignors to Eureka Vacuum Cleaner Company, Detroit, Mich., a corporation of Michigan Application October 8, 1943, Serial No. 505,566

2 Claims. (Cl. 171—324)

This invention relates to electric motor construction and has particular reference to a novel and efficient brush holder and assembly therefor.

A principal object of the invention is to provide a new and improved brush holder for electric motors and the like.

Another object of the invention is to provide a good current conducting path between the brush and the terminal which is connected to the brush holder.

Other objects and advantages will be apparent from a consideration of the following specification taken in conjunction with the accompanying drawing, of which there is one sheet and wherein:

Fig. 1 is a fragmentary view of a motor with certain parts thereof broken away to illustrate the construction of a brush holder embodying the invention;

Fig. 2 is a fragmentary sectional view taken along the line 2—2 of Fig. 1;

Fig. 3 is a sectional view taken along the line 3—3 of Fig. 2; and

Fig. 4 is a sectional view taken along the line 4—4 of Fig. 2.

The end bell 10 of an electric motor may be provided with a suitable bearing 12 in which is journaled one end of the armature shaft 14. A commutator 16 is in running engagement with a brush 18 which is slidably mounted in a metallic sleeve 20. The sleeve 20, as illustrated in Figs. 3 and 4, is generally rectangular in cross section and forms a part of the brush holder which also includes an annular plug 22 formed by a molded phenolic or other insulating member. The plug 22 is arranged within a suitable cavity formed in the end bell and is formed with a suitable opening in which the sleeve 20 is arranged. The opening in which the sleeve 20 is arranged at one end terminates in a threaded portion 24 which is adapted to receive a threaded cap or screw 26.

The opening in the plug 22 in which the sleeve 20 is arranged is provided with channels 28. In one of these channels a terminal 30 is arranged, such terminal being forced into the channel 28 and held in intimate engagement with the outside of the sleeve 20. The wire of a current conductor 32 may be soldered to the terminal 30 and if desired a soldered connection may be made between that part of the terminal 30 and the sleeve 20 which projects from the plug 22.

The brush 18 slidably fits within the sleeve 20 and is biased toward the commutator by a spring 34, one end of the spring bearing against the brush and the other end of the spring bearing against a spring clip 36 which is spring pressed within the other end of the sleeve 20 and held therein by the cap 26. The spring clip 36 includes a generally plate-like or dished portion 38 having flanges 40 which project laterally beyond the sides of the sleeve 20 and are adapted to engage the bottom surface of the threaded bore in which the plug 26 is secured. Diametrically opposed portions of the clip 36 are bent to form legs or lugs 42 which extend into the sleeve 20 and alongside certain of the side walls thereof. The legs 42 are generally parallel to each other but are bent so as to bias away from each other and into firm contact with the side walls of the sleeve 20. The edges of the legs 42 are arranged to press against the remaining side walls of the sleeve 20 thereby to establish a good electrical path between the spring clip 36 and the sleeve 20.

A coiled wire 44 connected at one end to the brush 18 and soldered to the other end to the dished portion 38 of the spring clip is adapted to provide a good current conducting path between the brush 18 and the spring clip, thereby completing a positive and dependable current connection between the brush 18 and the terminal 32. This good connection will be maintained even though the brush 18 wears considerably, as such path is not dependent for its character upon the nature of the fit between the brush 18 and the sleeve 20.

The end bell 10 and the plug 22 are provided with aligned slots 46 and 48. A brush holder comprising a retainer spring 50 extending through the slots 46 and 48 and bearing against the cap 26 is adapted to retain the cap 26 in the plug 22 as well as to retain the plug 22 in its opening in the end bell. The end 52 of the retainer spring 50 may be in the form of an eye and secured to the end bell by screw 54.

While the invention has been described with some detail, it is to be understood that the description is for the purpose of illustration only and is not definitive of the limits of the inventive idea. The right is reserved to make such changes in the details of construction and arrangement of parts as will fall within the purview of the attached claims.

We claim:

1. A brush holder and assembly for an electric motor comprising a plug having an opening therethrough, a metallic sleeve of rectangular cross section arranged in said opening, a brush slidably mounted in said sleeve and adapted to project from one end thereof for cooperation with the commutator of said motor, a metal clip fitted in the other end of said sleeve, a flexible current conducting connection between said brush and said clip, threaded means cooperable with a threaded portion of said plug for closing the opening in the plug remote from the commutator and a current conductor connected to said sleeve, said clip having expansible portions thereof spring biased into good electrical contact with said sleeve independently of said threaded means.

2. In combination with an electric motor having a frame member adjacent the commutator, a brush holder and assembly comprising a cylindrical plug having an opening therethrough and fitted in a cylindrical recess in said frame member, a metallic guide nonrotatably arranged in said opening, a brush slidably and nonrotatably mounted in said guide and adapted to project from one end thereof for cooperation with the commutator of said motor, a metal clip fitted on the other end of said guide, a flexible current conducting connection between said brush and said clip, a cap closing the opening in the plug remote from the commutator, a current conductor connected to said guide, said frame member and plug having aligned slots and a retainer and guide connected at one end thereof to said frame member and arranged in said slots, the other end of said retainer bearing against said cap for securing said assembly in said recess.

GEORGE R. COSS.
FREDERICK K. COMISKEY.